United States Patent
Hillier et al.

(10) Patent No.: US 9,930,633 B2
(45) Date of Patent: Mar. 27, 2018

(54) METHOD AND SYSTEM FOR DETERMINING A LOCATION OF A MOBILE DEVICE

(71) Applicants: Katayoun Hillier, Ottawa (CA); Peter M. Hillier, Ottawa (CA)

(72) Inventors: Katayoun Hillier, Ottawa (CA); Peter M. Hillier, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 0 days.

(21) Appl. No.: 14/640,059

(22) Filed: Mar. 6, 2015

(65) Prior Publication Data

US 2016/0262126 A1    Sep. 8, 2016

(51) Int. Cl.
*H04W 64/00* (2009.01)
*H04W 4/00* (2018.01)
*G01S 5/02* (2010.01)

(52) U.S. Cl.
CPC .............. *H04W 64/00* (2013.01); *G01S 5/02* (2013.01); *H04W 4/008* (2013.01)

(58) Field of Classification Search
CPC ........... H04M 2242/04; H04W 76/007; H04W 64/00; H04W 4/02; H04L 29/08657
See application file for complete search history.

(56) References Cited

U.S. PATENT DOCUMENTS

| | | | | |
|---|---|---|---|---|
| 8,254,350 B2* | 8/2012 | Ban | ................. | H04W 40/20 370/338 |
| 8,638,190 B1* | 1/2014 | Want | ................. | G06F 3/046 340/5.1 |
| 9,171,450 B2* | 10/2015 | Cho | ................. | G08B 25/10 |
| 2004/0199056 A1* | 10/2004 | Husemann | ........... | A61B 5/0002 600/300 |
| 2006/0193447 A1* | 8/2006 | Schwartz | ............ | H04M 1/2535 379/45 |
| 2007/0004379 A1* | 1/2007 | Stanners | ............... | H04M 1/725 455/404.2 |
| 2007/0167147 A1* | 7/2007 | Krasner | ............... | G08B 25/009 455/404.2 |
| 2010/0317317 A1* | 12/2010 | Maier | .................. | H04W 64/00 455/404.2 |
| 2011/0065416 A1* | 3/2011 | Burt | .................... | H04L 12/6418 455/404.2 |
| 2011/0306329 A1* | 12/2011 | Das | ...................... | G08B 25/016 455/416 |
| 2015/0289225 A1* | 10/2015 | Gao | .................... | H04W 64/003 455/456.5 |

\* cited by examiner

*Primary Examiner* — Omoniyi Obayanju

(57) ABSTRACT

Systems and methods for determining a location of a mobile device are disclosed. A location of a second (e.g., mobile) device can be determined using location information of a first (e.g., stationary or wired) device. The location information of the first device can be sent, using the second device, to a server, which can then transmit corresponding location information to, for example, a call center.

20 Claims, 3 Drawing Sheets

METHOD AND SYSTEM FOR DETERMINING A LOCATION OF A MOBILE DEVICE

FIELD OF THE DISCLOSURE

The present disclosure generally relates to electronic communication systems and methods. More particularly, the disclosure relates to electronic communication methods and systems for determining a location of a mobile device. Information relating to the location of the mobile device can be used (e.g., provided to emergency service providers) to locate a caller using the mobile device.

BACKGROUND OF THE DISCLOSURE

Many countries have an emergency response phone number that users can call to connect the caller to a call center, such as a public safety answering point (PSAP) call center of a government agency, which has jurisdiction over an area from which the caller is calling. The call center receives the call and can, in some cases, dispatch appropriate resources, such as firefighters, police, or ambulance first responders.

Many emergency response systems use enhanced emergency calling systems (e.g., e911 in North America) or similar technology to identify a phone number from which an emergency call was made and an address or location corresponding to that phone number. Such systems generally include a database, such as a private switch/automatic location information database that allows the PSAP to look up the caller's address associated with the phone number from which the call is made. These systems work relatively well when the database has accurate location information for a given phone number. However, when several phone numbers are associated with a particular building or area, such as the case of private branch exchange (PBX) systems, any location information stored in a database may not provide accurate location information for the caller.

PBX users are typically grouped into logical zones—e.g., by floor, by wing, by department, or the like. Each of these groupings is known as Emergency Response Location (ERL). Depending on the system, each ERL is typically assigned an emergency location identification number (ELIN) or a customer emergency service identification (CESID). Using ELIN or CESID information to identify a group of users reduces a number of records stored in the PS-ALI database. Thus, costs of the system can be reduced, and setup and maintenance of the e911 database can be simplified. When a call is made from a PBX extension to an emergency number (e.g., 911), a pre-assigned DID number based on the calling extension's ERL and matching ELIN will be sent to the call center to facilitate identifying a location of the caller.

Several challenges to providing accurate location information for a caller over a multi-line telephone system (MLTS), such as a PBX, exist. For example, significant overhead is required to map PBX extensions to physical locations within the property and to enter and maintain this information in an appropriate database. In addition, various communication systems allow for the use of call groups, wherein multiple devices can use a single number, making location information of a particular device difficult to determine. For example, if a device within the call or ring group is mobile and is using a VoIP application (e.g., a tablet computer such as an iPad or iPod), more complexities arise, because an emergency call placed from such a device will appear to originate from a wired phone, such as a user's desk phone, and not from the mobile device. Such problems can be particularly problematic for organizations, such as hospitality services providers, universities, schools, hospitals, and the like, where liabilities can be introduced when the incorrect location of a guest is reported during an emergency response. This emergency calling issue often prevents such organizations from offering voice services for fear of the potential liabilities.

Emergency calls can also be made from mobile phones. In the case of e911 and similar services, when an emergency call is originated from a mobile phone or similar device, nearest cell tower information and GPS location information can be sent to a call center to help identify a location of the caller. However, such information may not be as accurate as desired, particularly in large buildings, because GPS information can be inaccurate for indoor locations (e.g., it may be difficult to determine from which floor a user is calling). Moreover, GPS-based location devices within mobile devices may not function in some buildings due to poor GPS signal penetration.

Other problems can arise when mobile devices use WiFi or other wireless (e.g., digital enhanced cordless telecommunications (DECT)) technology. Some WiFi and DECT access points have been designed to provide location information that can be leveraged in emergency scenarios. However, the coverage area for these wireless technologies can be quite large, and connectivity to an access point on a floor above or below the user are commonplace. Thus, incorrect location information associated with a caller can result. Further, if a mobile device user uses a cellular connection, rather than a wireless technology connection, the user will not gain the benefit of the wireless or WiFi location ability to provide location information.

In addition, teleworker functionality, which allows remote users access through a firewall to a PBX, may result in providing incorrect location information for an e911 caller. For example, a teleworker system may indicate that a caller is at his or her desk, when he or she is instead away from the office.

Accordingly, improved systems and methods for providing accurate location of an emergency number caller are desired. The improved systems and methods may desirably leverage existing databases and systems. The improved systems and methods may additionally or alternatively provide relatively accurate location information for callers using a mobile device when, for example, inside a building, such as a building using a PBX.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Various exemplary embodiments of the disclosure provide methods and systems for determining a location of a mobile device or caller using the mobile device. While the ways in which exemplary methods and systems address the drawbacks of prior methods and systems are addressed in more detail below, in general, exemplary systems and methods can leverage information in existing databases and can provide more accurate location information for various forms of mobile devices. Further, exemplary systems and methods can allow for use of a telephone exchange or switching system in areas used for hospitality environments, schools, and enterprises, or the like, while providing desired location accuracy of callers making emergency calls from such premises. Thus, liabilities associated with using such systems are reduced or eliminated.

Figure 1:
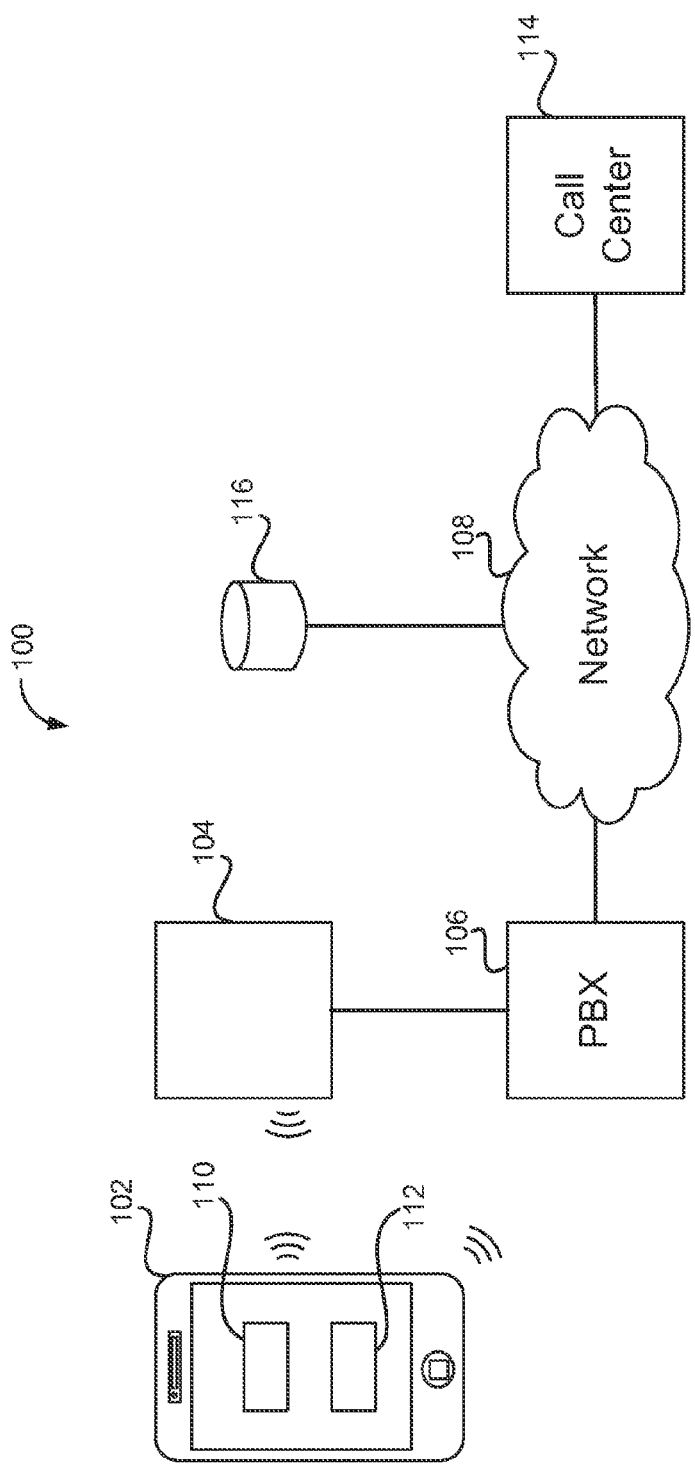
FIG. 1 illustrates a system in accordance with exemplary embodiments of the disclosure.

FIG. 1 illustrates a system 100 in accordance with exemplary embodiments of the disclosure. System 100 includes a mobile device 102, a broadcasting device 104, and a server, such as a multi-line telephone system (MLTS) or private branch exchange (PBX) 106, which is coupled to a network 108. A call center 114 and a database 116 are connected to network 108. Although illustrated with only one mobile device 102 and one broadcasting device 104, systems in accordance with various embodiments can include any suitable number of mobile devices and/or broadcasting devices.

Mobile device 102 can include any suitable device with wireless communication features. For example, mobile devices can include a wearable device, a tablet computer, a smart phone, a personal (e.g., laptop) computer, a streaming device, such as a game console or other media streaming device, such as Roku, Amazon Fire TV, or the like, or any other mobile device that includes wireless communication capabilities.

In accordance with some exemplary aspects of various embodiments of the disclosure, mobile device 102 includes communication components 110 (e.g., a short-range transmitter/receiver) for short-range wireless transmission of information between device 102 and broadcasting device 104 and an application 112.

Application 112 can be a stand-alone application or form part of a native dialing application and/or an operating system on device 102. When an emergency number, such as 911, is dialed using, for example, a voice over internet protocol (VoIP) call on mobile device 102, application 112 causes communication components (e.g., Bluetooth low energy (BLE), iBeacon, Infrared technology, WiFi, or the like) 110 to turn on or verifies that communication components 110 are on and are able to receive information from broadcasting device 104. Application 112 then determines the closest broadcasting device 104. The determination can be based on, for example, a signal strength, known locations of broadcasting device 104 and mobile device 102, information received from other broadcasting devices, and the like. Application 112 and/or mobile device 102 receive location information (e.g., a directory number (DN)) associated with broadcasting device 104. The location information is then transmitted using mobile device 102 to PBX 106. For example, the location information (e.g., a DN) of broadcasting device 104 can be transmitted to PBX 106 with the emergency call. PBX 106 can then transmit an ERL and ELIN or CESID to call center 114, as set forth in more detail below.

Additionally or alternatively, when device 102 is used to make an emergency call as a cell phone, initialing an emergency call activates a positional system, such as an indoor positioning system or location reporting system—e.g., iBeacon on the mobile device. Indoor positioning systems can be relatively complex detection systems, whereas location reporting systems, such as iBeacon can be relatively simple and report a location value that has been preprogrammed. In accordance with some exemplary embodiments, application 112 then receives location information (e.g., a DN) from nearby broadcasting device(s) 104. In a similar manner as noted above, the location information of broadcasting device 104 can be transmitted with the emergency call to call center 114. For example, once mobile device 102 detects the DN of the closest broadcasting device 104 and sends this information to the PBX (or other suitable server), and the server translates the DN into a ERL, ELIN, or CESID. In other words, mobile device 102 "pretends" to be another device to take advantage of existing PBX functionality.

In accordance with some exemplary embodiments, mobile device 102 could obtain and transmit an ERL, ELIN and/or CESID to call center 114. In other words, mobile device 102 itself can perform the DN to CESID translation, or read the CESID directly from broadcasting device 104 and can provide the CESID directly. In addition, nearby cell tower location to mobile device 102 and/or GPS location information of mobile device 102 can be transmitted to call center 114, when such information is available. The additional information can be transmitted during a call setup.

In accordance with some embodiments of the disclosure, application 112 continues to run in the background during an emergency call. In this case, application 112 can track location information of a caller, even if a caller is moving, and provide updated or real-time location information (e.g., a DN of the nearest broadcasting device) to PBX 106. This allows a call center to track a caller after the caller initiates the emergency call. For example, a nearest broadcasting device 104 can change as mobile device 102/the caller moves. This updated information can be transmitted during a call. In accordance with some examples, mobile device 102 performs a DN to CESID translation and/or similar translation as noted above while tracking mobile device 102.

Broadcasting device 104 may include any device capable of short-range wireless communication with mobile device 102. By way of examples, device 104 may include a wired device, a desk phone, a conference unit, a stand-alone device, a dedicated broadcasting device (e.g., a device dedicated to broadcasting location information—e.g., for use by emergency services providers), or the like having short-range wireless communication hardware. Broadcasting device emits a signal, e.g., using one or more of the protocols noted below, that can be used by mobile device 102 to determine a location of broadcasting device 104 and/or mobile device 102. By way of examples, broadcasting device 104 broadcasts a directory number (DN). The DN can be transmitted to PBX 106, as described herein. Alternatively, broadcasting device 104 could transmit ELIN or CESID information directly to mobile device 102, thereby eliminating a lookup step.

Suitable short-range device protocols for communication between mobile device 102 and broadcasting device 104 include Near Field Communication (NFC), Bluetooth, Bluetooth low energy (BLE), iBeacon, Infrared technology, WiFi, and the like. By way of examples, mobile device 102 and broadcasting device 104 use BLE communication protocols and device 110 includes suitable receiver/transceiver components.

Network 108 may include a local area network (LAN), a wide area network, a personal area network, a campus area network, a metropolitan area network, a global area network, a local exchange network, a public switched telephone network (PSTN), a cellular network, the like, and any combinations thereof. Network 108 may be coupled to PBX 106 and/or call center 114 using an Ethernet connection, other wired connections, or wireless interfaces. Network 108 may be coupled to other networks and/or to other devices typically coupled to networks.

PBX 106 or other suitable telephone exchange or switching system/server provides a connection between mobile device 102 and network 108. In accordance with various embodiments of the disclosure, PBX 106, upon detecting an emergency call and seeing the emergency location field (e.g., a DN), applies special call handling on the outbound call leg to call center 114. For example, PBX 106 can include a database. PBX can use the database and the emergency location field (e.g. DN) to determine the closest broadcasting device (e.g., a desk phone) to the mobile caller, look up corresponding location information—e.g., ERL for broadcasting device 104 and a corresponding ELIN and/or CESID associated with the ERL, and send information as the DID to call center 114. This will allow a caller's proper location to be determined using the current emergency information provided by an enterprise.

Call center 114 can use database 116 to look up associated location information associated with information transmitted by PBX 106 to call center 114. For example, database 116 can store address and other location information associated with a DID that is transmitted to call center 114 during an emergency call.

Figure 2:
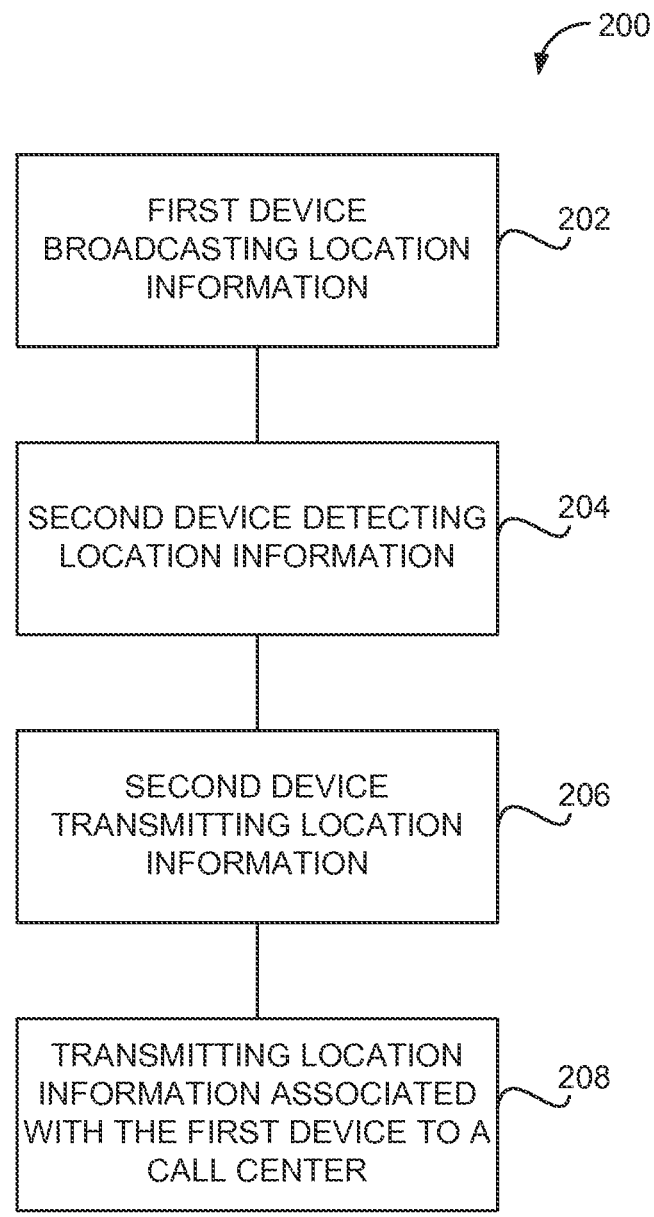
FIG. 2 illustrates a method in accordance with exemplary embodiments of the disclosure.
Figure 3:
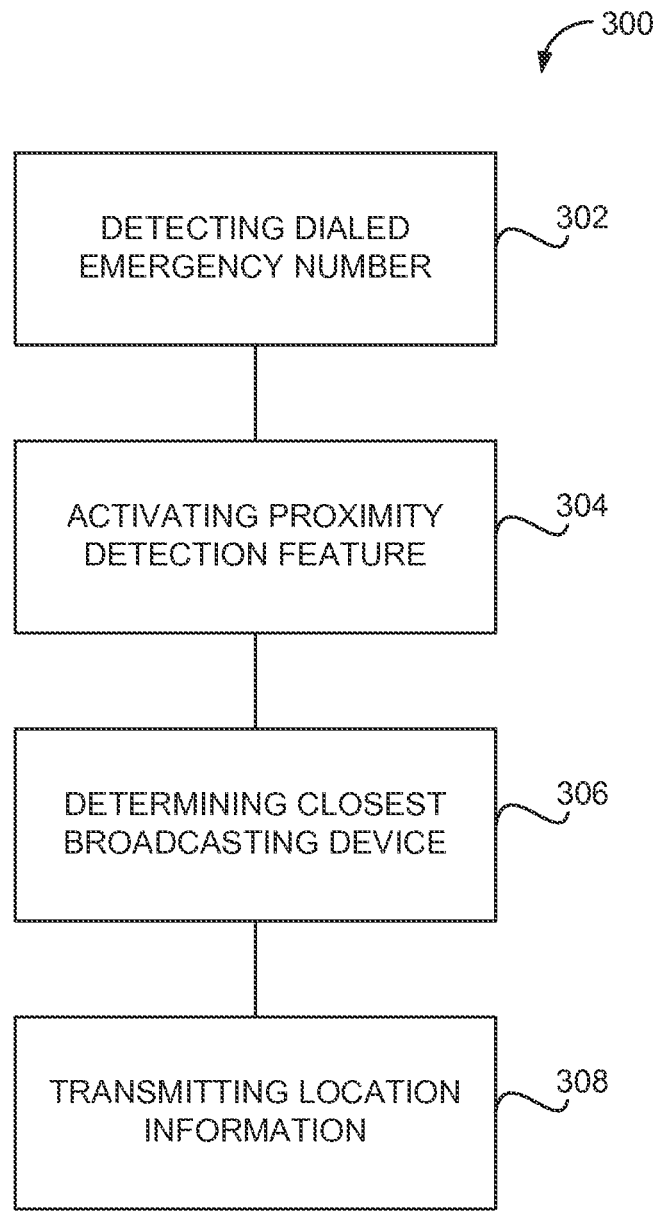
FIG. 3 illustrates another method in accordance with exemplary embodiments of the disclosure.

FIGS. 2 and 3 illustrate exemplary methods 200 and 300 in accordance with further exemplary embodiments of the disclosure. As set forth in more detail below, the exemplary methods can be used to provide location information (e.g., to a call center and/or first responders) of mobile devices, including cell phones, even when such devices are located within a building. Further, the exemplary methods can leverage existing information in existing databases to thereby minimize expenses associated with such methods and systems employing the methods.

With reference to FIG. 2, method 200 includes the steps of a first device (e.g., broadcasting device 104) broadcasting location information (step 202), the second device (e.g., mobile device 102) detecting the location information (step 204), the second device transmitting the location information (step 206), and transmitting location information associated with the first device to a call center (step 208).

During step 202, any suitable location information including, for example, a DN, ERL, ELIN and/or CESID, can be broadcast. By way of example, a DN associated with the first device is broadcast during step 202.

During step 204, the location information broadcast by the first device is detected by the second device. Step 204 can be done at any time or can be performed by an application (e.g., application 112) when an emergency call is initiated.

During step 206, the location information of the first device is transmitted using the second device. By way of example, when an emergency number is detected, e.g., by application 112, application 112 causes communication components (e.g., BLE) 110 to turn on or verifies that communication components 110 are on and are able to receive information from broadcasting device 104. Application 112 then determines the closest broadcasting device 104—e.g., using techniques described herein. Once the nearest broadcasting (first) device is determined, information, such as the first device DN, or corresponding ERL and/or ELIN or CESID, are transmitted using the second device.

Location information is then transmitted to a call center during step 208. For example, in the case of a VoIP call, emergency location information is sent to a PBX (e.g., PBX 106). The PBX, upon detecting an emergency call and seeing the emergency location field, can apply special call handling on the outbound call leg to a call center, as noted above. In the case of cellular calls, a mobile phone can transmit broadcasting device location information and/or emergency location information directly to a call center. The mobile phone can additionally transmit cell tower and/or GPS information at the initiation of and/or during the call.

Method 200 can be configured to continually provide emergency location information of a second device based on a location or locations of one or more first devices. Thus, method 200 can track a caller as he or she moves relative to first/broadcasting devices.

Turning now to FIG. 3, method 300 includes the steps of detecting a dialed emergency number (step 302), activating a proximity detection feature on a mobile device (step 304), determining a closest broadcasting device (step 306), and transmitting mobile device location information based on the nearest broadcasting device location information.

During step 302, an application, such as application 112, detects a caller entering an emergency number (e.g., 911) on a mobile device. The number can be entered using, for example, a VoIP application or a mobile phone dialing application.

At step 304, if proximity detection devices (e.g., communication components 110, such as BLE components) are not activated, such devices are turned on. More than one proximity device may be turned on or verified during this step and/or during similar steps described herein.

During step 306 and similar steps described herein, a location of a nearest broadcasting/first device is determined. As noted above, the determination can be based on signal strength, GPS coordinates, or a combination thereof. For example, a location of the nearest broadcasting device can be based on WiFi and/or BLE signal strength.

Once a nearest broadcasting device is determined, a mobile/second device transmits the location information as part of a call or call set-up. For example, the mobile device can transmit a DN associated with a broadcasting device to a PBX during an emergency call. The PBX can then look up a corresponding ERL, ELIN, and/or CESID to be broadcast to a call center (e.g., call center 114). The call center can then look up the associated location information (e.g., using database 116).

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

What is claimed is:

1. A method of determining a location of a mobile device, the method comprising the steps of:
    using short-range wireless communication, a plurality of first devices broadcasting location information comprising one or more of a directory number (DN) associated with a location of one of the broadcasting devices, an emergency response location (ERL) associated with users grouped by one or more of a logical zone and a location, an emergency location identification number (ELIN), and a customer emergency service identification (CESID), wherein the ERL is assigned to the ELIN or the CESID, and wherein each of the plurality of first devices is selected from the group consisting of: a wired device, a desk phone, a conference unit, and a device dedicated to broadcasting location information;
    using short-range wireless communication and an application, a second device determining using one or more of signal strength, known locations of the plurality of first devices, and information received from other broadcasting devices a nearest of the plurality of first devices; and
    using the second device, transmitting the location information to a server as part of a call setup; and
    using the server, determining corresponding location information and sending the corresponding information to a call center.

2. The method of claim 1, wherein the short-range wireless communication is selected from the group consisting of one or more of: near-field communication, Bluetooth, Bluetooth Low Energy, and WiFi (wireless local area network).

3. The method of claim 1, wherein the second device is a mobile device.

4. The method of claim 1, wherein the server comprises a PBX (private branch exchange).

5. The method of claim 1, wherein the server comprises a database and the server uses the location information to determine the corresponding location information.

6. The method of claim 1, wherein the first device is a wired communication device.

7. The method of claim 6, wherein the wired communication device comprises a phone.

8. The method of claim 1, wherein the server transmits associated location information associated with the first device to a public service answering point.

9. The method of claim 8, wherein the associated location information comprises a direct inward dialing number.

10. The method of claim 1, wherein the second device comprises a mobile device, and the mobile device further transmits GPS (global positioning system) information of the mobile device to the server.

11. The method of claim 10, wherein additional location information is transmitted to a public service answering point.

12. A method of determining a location of a mobile device and transmitting information to a public service answering point, the method comprising the steps of:
    using an application on the mobile device, detecting a dialed emergency number on the mobile device;
    using the application, activating a proximity detection feature on the mobile device;
    using the application, determining, using one or more of signal strength, known locations of a plurality of first devices, and information received from other broadcasting devices, a closest broadcasting device from the plurality of broadcasting devices wherein each of the plurality of first devices is selected from the group consisting of: a wired device, a desk phone, a conference unit, and a device dedicated to broadcasting location information; and
    transmitting, using the mobile device, location information comprising one or more of a directory number (DN) associated with a location of one of the broadcasting devices, an emergency response location (ERL) associated with users grouped by one or more of a logical zone and a location, an emergency location identification number (ELIN), and a customer emergency service identification (CESID), wherein the ERL is assigned to the ELIN or the CESID, to one or more of a server and a call center during a call setup.

13. The method of claim 12, wherein the step of determining comprises using short-range wireless communication.

14. The method of claim 13, wherein the short-range wireless communication is selected from the group consisting of one or more of: near-field communication, Bluetooth, Bluetooth Low Energy, and WiFi (wireless local area network).

15. The method of claim 12, wherein the step of transmitting comprises sending the location information to the server.

16. The method of claim 15, further comprising a step of the server transmitting corresponding location information to a public service answering point.

17. The method of claim 15, further comprising a step of transmitting a direct inward dialing number to a public service answering point.

18. A system for determining a location of a mobile device and transmitting corresponding location information to a public service answering point, the system comprising:
    a mobile device comprising an application for detecting dialing of an emergency number;
    a plurality of broadcasting devices that broadcast location information comprising one or more of a directory number (DN) associated with a location of one of the broadcasting devices, an emergency response location (ERL) associated with users grouped by one or more of a logical zone and a location, an emergency location identification number (ELIN), and a customer emergency service identification (CESID), wherein the ERL is assigned to the ELIN or the CESID, to the mobile device, wherein each of the plurality of first devices is selected from the group consisting of: a wired device, a desk phone, a conference unit, and a device dedicated to broadcasting location information; and
    a server that receives the location information from the mobile device and transmits corresponding location information of the mobile device to the public service answering point.

19. The system of claim 18, wherein the broadcasting device comprises a phone having a direct inward dialing number associated therewith.

20. The system of claim 18, wherein the server comprises a PBX (private branch exchange).

\* \* \* \* \*